Sept. 18, 1928.

G. E. HAZARD

CHECK VALVE

Filed Nov. 3, 1927

1,684,987

Inventor

George E. Hazard

By A. S. Pattison Sr.

Attorneys

Patented Sept. 18, 1928.

1,684,987

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

CHECK VALVE.

Application filed November 3, 1927. Serial No. 230,911.

My invention relates to improvements in check valves, of the type which is more particularly adapted for use in the air-line between the compressor and a storage tank, although from the following description it will be readily apparent that the invention is not limited to the particular use described and illustrated. The primary object of this invention is providing the valve with a downwardly extending hollow member fitting in a cylindrical dash pot and providing the wall of the hollow member with an opening so placed that it will act to close before the valve seats thus causing the valve to seat against pressure, whereby the usual hammering of the valve when seating is avoided.

Another object of the present invention is providing the hollow member depending from the said valve with an opening so located that it serves the double function of causing the valve to open against a vacuum and when opened causing the valve to seat against pressure whereby the hammering and chattering of the valve is prevented.

Figure 1:
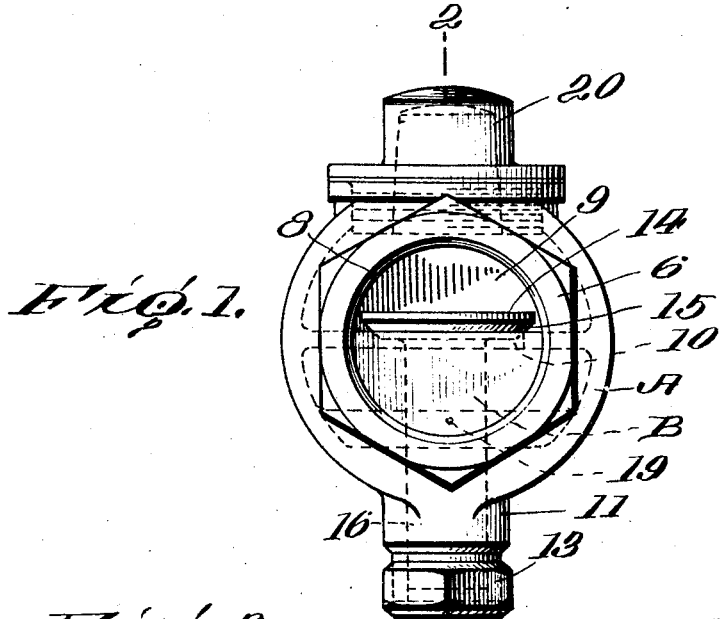
Figure 1 is an end view of the inlet end of the check valve, the valve and the interior of the valve housing being shown in dotted lines.

By reference to the drawing, it will be seen that the entire check valve and housing is designated by A, and this housing has at its opposite sides open ends 5 and 6, which are internally threaded as at 7 and 8, to enable the check valve to be placed in the air-line between a compressor and a storage tank.

The end 5 of the housing is the inlet end, and the end 6 the outlet end of the check valve. Positioned centrally of the housing there is a division wall 9, having therein a circular opening 10. Positioned below the opening 10 is an elongated cylinder which forms a dash pot 11. The inner end 12 of this dash pot is open and extends into the interior of the valve housing, while the opposite end of the cylinder dash pot is closed by a suitable removable cap 13.

The valve, designated by the letter B, comprises a head 14 having a tapered under side 15, which is adapted to seat upon the upper edge of the opening 10 in the division wall 9.

The valve head is provided with an elongated tubular stem 16, which for the greater portion of its length is hollow, as designated at 17. The lower end 18 of this hollow stem is open and the major portion of the stem extends into the dash pot 11. The valve stem is of a diameter to closely fit, yet move freely in the dash pot.

Figure 2:
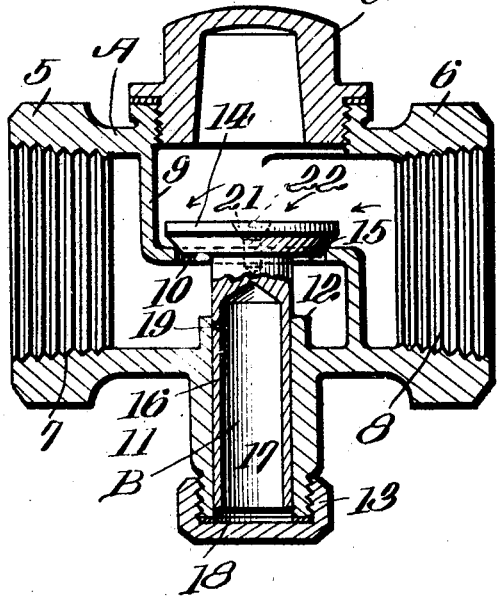
Fig. 2 is a vertical sectional view taken on the line 2—2 of Fig. 1, looking in the direction indicated by arrows, the valve being shown in closed position.

The hollow portion of the valve stem is provided with a bleeder hole 19, and this hole is so positioned that when the valve is in a closed position, as indicated in Fig. 2 of the drawing, it is below the upper or inner end 12 of the dash pot and thereby closed against communication with the interior of the check valve housing.

Immediately above the valve, the housing A is provided with a removable cap 20, the diameter of which is such that the valve can be removed through the cap opening when it is found desirable or necessary to examine the valve or to grind it for the purpose of insuring a better seating of the valve.

As is common, the valve head is provided with a screw 21 having an inner slot 22 to enable the valve to be readily revolved by a screw-driver for the purpose of grinding in the seating surface of the valve head.

By reason of the removable cap 13, the dash pot can at all times be emptied or cleaned of any accumulation of dirt, water or a collection of any other foreign matter or substance.

Operation.

From the foregoing description with reference to the accompanying drawings, it will be clearly seen that the operation of the device is as follows:

When the compressor delivers air to the inlet side or end 5 of the housing, this air will lift the valve B from its seat and allow the air to pass outwardly through the outlet end 6 of the housing in the pipe-line and ultimately to the storage tank.

When the valve starts upward, a vacuum is created in the dash pot. This vacuum tends to steady the valve and prevent it chattering. It will be further understood that as the valve must, through its initial movement, move against a vacuum, the valve will not have a tendency to be affected by slight and varying degrees of pressure beneath the enlarged valve head. In other words, the vacuum steadies the valve against fluctuation and, consequently, will not be opened until a really appreciable amount of pressure is exerted upon the underside of the valve head.

Figure 3:
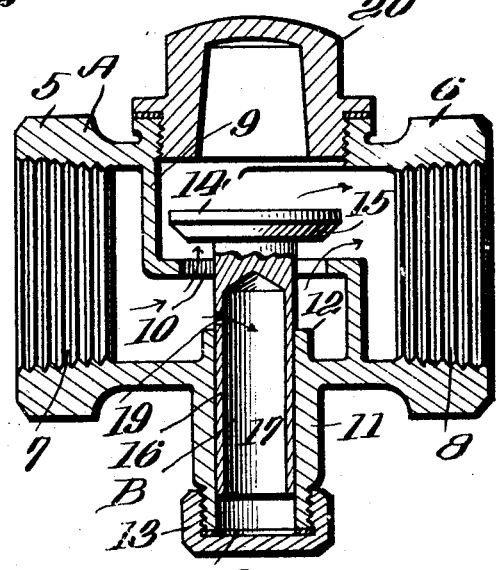
Fig. 3 is a vertical sectional view similar to Fig. 2, the valve being shown in open position.

When the upward movement of the valve and valve stem brings the bleeder hole 19 to a point above the upper or inner end 12 of the dash pot, the vacuum in the dash pot is broken and air rushes into the hollow valve stem and dash pot through this bleeder hole, as clearly indicated by arrow in Figure 3 of the drawings.

From the foregoing it will be seen that when the compressor is not delivering air the back pressure from the storage tank will act upon the valve to move it downwardly into a closed position. This downward movement of the valve is, however, retarded by the air in the hollow valve stem and dash pot. The valve cannot seat rapidly and thus cause a hammering as its downward travel is controlled by the bleeder hole through which the air in the hollow stem must be forced.

It will be noted that the bleeder hole is closed by the upper end of the dash pot just prior to the seating of the valve with the result that there is still some air in the valve stem and dash pot which forms an air cushion against the actual seating of the valve. The seating of a valve against an air cushion makes the operation of the device quiet.

I am aware that various efforts have been made to prevent noisy valves, and I am aware of many constructions and efforts to avoid the hammering of the valves and the chattering of the valves. So far as I am aware however a valve has not been heretofore produced which is noiseless in its seating action and in its opening action.

Having described the construction and operation of my device, its many advantages and novel features of construction will readily be apparent.

Having thus described my invention, what I claim and desire to secure by Letters Patent is:

1. A valve constructed as hereinafter defined comprising a housing that has an intermediate longitudinally extending wall with a valve seat, a valve seating on the said wall, a cylindrical dash pot extending laterally from the said housing and having a closed outer end, and a hollow stem secured to the said valve and movably fitting within the said dash pot, said hollow member having an opening which is normally closed when the valve is on its seat and whereby the valve opens against suction in the hollow member, said opening being also so located that after the valve is open and before it closes the said opening in the hollow stem is closed by the inner end of the dash pot whereby hammering of the valve is obviated.

2. A valve constructed as herein shown comprising a housing, a Z-shaped division wall within the said housing, the longitudinal portion of the Z-shaped wall having an opening forming a valve seat, said housing provided with a laterally extending dash pot having a closed outer end, a valve seating on the wall of the said opening and the valve having a projecting hollow stem movably fitting in the said dash pot, the hollow stem provided with an opening located just below the inner end of the dash pot when the valve is seated and above the inner end of the dash pot when the valve is unseated whereby the hollow stem is caused to open against a vacuum and to close against a compression, whereby the said valve is prevented from hammering and chattering making a quiet operating structure.

In testimony whereof I hereunto affix my signature.

GEORGE EDGAR HAZARD.